United States Patent
Muthiah

(10) Patent No.: US 6,537,671 B2
(45) Date of Patent: Mar. 25, 2003

(54) COATING POWDERS HAVING ENHANCED ELECTROSTATIC CHARGEABILITY

(75) Inventor: Jeno Muthiah, Arlington Heights, IL (US)

(73) Assignee: Alpha Coating Technologies, LLC, Mt. Prospect, IL (US)

( * ) Notice: Subject to any disclaimer, the term of this patent is extended or adjusted under 35 U.S.C. 154(b) by 0 days.

(21) Appl. No.: 09/730,166

(22) Filed: Dec. 5, 2000

(65) Prior Publication Data

US 2002/0102406 A1 Aug. 1, 2002

(51) Int. Cl.[7] .................................................. B32B 27/06
(52) U.S. Cl. ........................ 428/413; 428/418; 524/81; 524/86; 525/421; 525/437; 525/404
(58) Field of Search ................................. 428/413, 418; 525/421, 437, 438, 440; 524/81, 86

(56) References Cited

U.S. PATENT DOCUMENTS

| | | |
|---|---|---|
| 4,147,737 A | 4/1979 | Sein et al. |
| 4,686,108 A | 8/1987 | Nason et al. |
| 4,868,059 A | 9/1989 | Walker et al. |
| 5,168,110 A | 12/1992 | Van Den Elshout et al. |
| 5,169,473 A | 12/1992 | Bertram et al. |
| 5,270,416 A | 12/1993 | Toman et al. |
| 5,288,579 A * | 2/1994 | Tanaka et al. ......... 430/108.21 |
| 5,304,332 A | 4/1994 | Richart |
| 5,344,672 A | 9/1994 | Smith |
| 5,436,311 A | 7/1995 | Hoebeke et al. |
| 5,480,726 A | 1/1996 | Richart |
| 5,714,206 A | 2/1998 | Daly et al. |
| 5,721,052 A | 2/1998 | Muthiah et al. |
| 5,731,043 A | 3/1998 | Horinka et al. |
| 5,824,373 A | 10/1998 | Bitler et al. |
| 5,922,473 A | 7/1999 | Muthiah et al. |
| 6,048,949 A | 4/2000 | Muthiah et al. |
| 6,077,610 A | 6/2000 | Correll et al. |
| 6,113,980 A | 9/2000 | Laver |

FOREIGN PATENT DOCUMENTS

| | | |
|---|---|---|
| EP | 0148637 A1 | 7/1985 |
| EP | 0 214 448 A2 | 3/1987 |
| EP | 0933140 A1 | 8/1999 |
| WO | WO98/58748 | 12/1998 |

* cited by examiner

Primary Examiner—Robert Dawson
Assistant Examiner—Christopher M. Keehan
(74) Attorney, Agent, or Firm—Gerald K. White

(57) ABSTRACT

Inert nitrogen-containing compounds, such as melamine, urea, dicyandiamide, and benzoguanamine and derivatives of such compounds are added to thermosetting resin powder coatings to enhance the electrostatic charge of the powders. Such enhancement improves coating processes for non-conductive and conductive substrates.

16 Claims, No Drawings

COATING POWDERS HAVING ENHANCED ELECTROSTATIC CHARGEABILITY

The present invention relates to thermosetting resin coating powder compositions having enhanced electrostatic chargeability. The coatings are applied using conventional electrostatic equipment and then fused and cured. The coating powder compositions of the invention include inert nitrogen-containing compounds that function as electrostatic charge enhancing agents. By inert, it is meant that these compounds are not chemically reactive with other compounds of the coating powder under the conditions the compounds are normally exposed, i.e., during powder manufacturing and coating. Melamine, urea, dicyandiamide, and benzoguanamine and derivatives thereof are inert nitrogen-containing compounds that enhance chargeability. The use of these coating powders eliminates or minimizes the need for the surface preparation of non-conductive substrates prior to electrostatic application and serves to improve coating thickness, uniformity, and quality.

BACKGROUND OF THE INVENTION

Coating powders are extremely desirable for coating substrates because such powders are virtually free of the fugitive organic solvents that are conventionally used in liquid paint systems. Powder coatings, thus, emit few, if any, volatile materials to the environment when heat or radiation cured. Problems of air pollution and health dangers to workers employed in painting operations are thereby reduced.

Solventless fusion coating processes have been developed to apply coating powders on substrates in which dry, finely divided, free flowing heat fusible powders are deposited on the substrates and then fused and cured with heating to form continuous, protective or decorative films. Examples of such coating processes include electrostatic spray and fluidized bed techniques; with the electrostatic spray technique being more frequently used in industry.

Although powder coatings have many benefits, it is difficult to coat electrically non-conducting substrates such as plastic, wood, and wood composites. The two main challenges are the need for low curing temperatures and the need for enhancement of the electrostatic attraction of coating powder to non-conductive substrates. The past several years, new technologies have been introduced into the market for providing low temperature cure powder coatings. U.S. Pat. Nos. 5,714,206 and 6,077,610 involve two-component coating powders that can be cured at the low temperatures required for wood and a variety of other metallic and non-metallic substrates. This result is achieved by mixing resin and curing agent components following extrusion in the dry form. The procedure eliminates heating, and thus reaction, of the two components together until they are deposited on the substrate. U.S. Pat. No. 5,721,052 discloses epoxy resins cured with imidazole adducts to obtain low temperature cure powder coatings, especially black textured coatings. U.S. Pat. No. 5,824,373 discloses UV curable powder coating to further reduce cure temperatures through the use of UV radiation curing. All of the above patents address the low cure temperature aspect of the powder coatings for non-conductive substrates and thus address the problem of substrate degradation at normally used higher powder coating cure temperatures. A further challenge remains in the enhancement of the attraction of coating powders to non-conductive substrates prior to curing.

Powder attraction techniques, such as those discussed below, are known in the art.

U.S. Pat. No. 5,731,043 discloses producing coating powders of controlled particle size distribution to improve tribo-charging characteristics for wood and metal substrates. Several other techniques have been developed to impart sufficient electrical conductivity to the substrate so that the substrate can be electrostatically powder coated. A conductive material, such as graphite, can be added to the substrate to improve substrate conductivity. However, this technique has the disadvantage that modification of the character of the substrate is required.

European Patent Publication No. 0933140A1 discloses a method where the substrate can be preheated to cause the powder particles to partially cure and adhere when the particles initially contact the heated surface. Preheating wood substrates also assists in driving moisture to the surface and thereby assisting the electrostatic application. Due to the varying nature of the wood substrates, controlling the moisture content is very difficult. Should the moisture content be too low, even preheating the part will not sufficiently improve electrostatic application. Excessive preheating to improve conductivity can also be detrimental to the substrate. Moreover, preheating parts that have sharp edges permits moisture to escape more rapidly from such edges than from thicker areas, thereby rendering powder application very difficult.

A typical solution to the electrostatic application problem is to apply a conductive primer to the substrate prior to powder application. This approach is illustrated in U.S. Pat. No. 5,344,672 where an electrically conductive primer, typically containing metallic or graphite particles, is coated onto the surface of the substrate. Although such approach is operable, it interposes an electrically conductive coating between the substrate and the cured powder coating and thus requires an additional process step that is not required by the present invention. Electrically conductive coatings can interfere with some intended uses of the finished part, which otherwise would not exhibit electrical conductivity. The present invention does not require such conductive primer.

Still another approach involves the application of an antistatic material to the substrate prior to coating powder application. Patent Publication No. WO98/58748 and U.S. Pat. No. 4,686,108 disclose that the use of conductive polymeric coatings having a charge density of greater than 2, after being applied to nonconductive substrate, permits subsequent overcoating of the substrate by electrostatic spraying. The antistatic coating, typically on the order of a few micrometers thick or less, provides sufficient electrical conductivity to the surface to permit electrostatic powder coating. The surface conductivity of the antistatic-coating substrate is about $10^{12}$ ohms per square or more, and may be adjusted by heat treatments. Such high resistivity does not result in unacceptable electromagnetic wave attenuation for most end use applications. A limitation of this approach is that multiple steps are involved in finishing operations. The present invention does not require such antistatic materials.

Antistatic agents most commonly are amines, such as tertiary amines, or ammonium compounds, such as quaternary ammonium compounds. These agents cannot be incorporated into coating powder formulations because such agents are commonly used at very low levels (less than 0.5 part per 100 parts of resin) as catalysts in many coating powder formulations. This approach is limited with respect to the amount of material that can be incorporated in the formulation because ammonium compounds also function as cure catalysts for most coating powder formulations.

Finally, U.S. Pat. No. 6,113,980 discloses improving chargeability of powder coatings using electron donor compounds for coating metal substrates by tribocharging the coating powders. Certain hindered amines are disclosed as such compounds. The implementation of this approach has been hindered by the lack of commercial availability of the charge control agents as well as the cost of these materials. The chemical structure of these hindered amine compounds can impart performance characteristics to the coating powders that may not be desirable, at least in some formulations. The patent requires that the electron donor compounds comprise at least two different compounds containing a residue of the following formula:

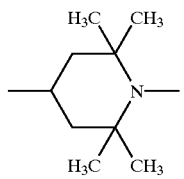

On the other hand, the present invention utilizes electrostatic charge enhancement compounds for powder coating non-conductive substrates that are quite structurally distinct from that of said U.S. Pat. No. 6,113,980. Moreover, the present invention requires only a single ingredient and is thus less cumbersome.

There remains a need for further improved technique to enhance the electrostatic powder coating of electrically non-conducting and electrically conducting substrates. Such technique would find widespread application in the coating of, for example, wood, wood composite materials, ceramics, glass, plastics, and the like as well as metal. It is believed that such enhancement not only fulfills a long-standing need in the art but also provides additional advantages.

SUMMARY OF THE INVENTION

The coating powders of the invention include as a component an inert nitrogen-containing compound such as melamine, urea, benzoguanamine, dicyandiamine, and derivatives of such compounds. The term "inert" means that the compounds do not react with other components of the coating powder during manufacturing steps of the powder, such as extrusion, or during coating temperatures when the powder is applied to a substrate. Thus, the essentially unreacted compound is free to perform its function as an electrostatic charge enhancement agent during the coating process. The balance of the powder is a thermosetting resin polymer that may contain other ingredients that are typically included in coating powders.

In one advantageous aspect, the process of the invention involves coating non-conductive substrates by providing the above described coating powder, electrostatically charging said powder, applying the charged powder to a non-conductive substrate, and then curing the applied powder by use of heat or radiation. Curing is conducted at temperatures below about 300° F. for heat sensitive substrates such as wood and plastic to avoid damage to such substrates. Curing temperatures greater than about 300° may be used for other non-conductive substrates capable of withstanding higher curing temperatures such as glass, ceramics, etc. Because of the enhancement of chargeability of the coating powders, conductive substrates, such as metals, may also be coated. The prsent invention is especially useful where thin or complex cross-sections are being coated because coating uniformity is enhanced by use of the coating powders of the present invention. The coated article of the present invention results from the above-described process.

DETAILED DESCRIPTION OF THE PREFERRED EMBODIMENTS

The present invention generally involves, in one aspect, low temperature curing, thermosetting coating powders containing inert nitrogen-containing compounds such as melamine and others, which function as electrostatic charge enhancement agents. Such coating powders are applied to non-conductive, heat sensitive substrates such as wood and plastic, and then cured at temperatures below about 300° F. The inertness of the compounds (lack of reaction during extrusion and coating powder application to the substrate permits the compounds to be available to function as electrostatic charge enhancement agents. Such coating powders can be applied, particularly by electrostatic spray coating, to non-conductive substrates without need for primers or excessive heating of the substrate. Such coating powder formulations flow freely during application and cure at low temperatures without damage to the substrate.

Enhanced electrostatic charging characteristics are developed by incorporating nitrogen-containing inert materials, such as melamine, urea, dicyandiamide and benzoguanamine, and derivatives thereof, into the thermosetting coating powders. The inert characteristic of these materials is derived from a high melting point and/or chemical reactivity. If they have low melting point and/or chemical reactivity, other compounds will react with the resin system and cause premature reactions in the extruder and unwanted changes to the coating appearance as well as decrease storage stability of the powder coating. These compounds need to be used at levels much higher than the catalytic usage levels. The incorporation of charge-improving agents into the coating powder composition eliminates multiple steps otherwise required to produce a high quality finished part in the coating process. The electrostatic charge enhancing agents of the invention are readily available at very low cost. Another important result of the invention is that appearance and performance of the coating is not altered, even at very high loading of the electrostatic charge enhancing agents. Enhanced electrostatic charge also leads to thicker coatings, improved coating uniformity, as well as to improved coating at part edges and at thinner cross-sectional areas of the part.

The above-mentioned electrostatic charge enhancement agents may be incorporated into a variety of thermosetting resin polymers including epoxies, saturated polyesters, unsaturated polyesters containing a surface curing initiator, polyester-epoxy hybrids, acrylics, and admixtures thereof. Curing agents and/or catalysts for such resins are selected to obtain a curing temperature of about 300° F. or less for heat sensitive substrates to avoid damaging such substrates during curing. Curing temperatures in excess of 300° F. may be used for substrates such as glass, ceramics, ceramic tiles, graphite, carbon, metal, and the like, which would not be damaged at curing temperatures over 300° F.

Low-temperature curing epoxy resin systems such as set forth in U.S. Pat. Nos. 5,714,206 and 5,721,052, are suitable for use in this invention. Both systems are curable at temperatures of 300° F. or below.

Epoxy resins included in U.S. Pat. No. 5,714,206 are exemplified by, but not limited to, those produced by the reaction of epichlorohydrin and a bisphenol, e.g., bisphenol A. Preferred epoxy resins include those sold under the trademarks ARALDITE GT-7072, 7004, 3032, 6062, and 7220, and EPON 1007F, 1009F, and 1004, all of which are 4,4'-isopropylidenediphenol-epichlorohydrin resins.

The epoxy resin is self-curing, i.e., it reacts via homopolymerization during curing of the powder coating. Generally, a catalyst is required to cause the reaction to progress at a commercially acceptable rate. A suitable catalyst is an epoxy adduct of an imidazole having the general formula:

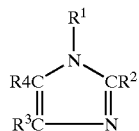

Wherein $R^1$, $R^2$, $R^3$, and $R^4$ are independently hydrogen or any substituent, which is not reactive with the epoxy resin. Examples of suitable imidazoles with a bisphenol A epoxy resin are available commercially from Shell Chemical Company under its trademark EPON, e.g., EPON P-101, and also from Ciba-Geigy corporation under its designation HT 3261. The term imidazole includes both substituted and unsubstituted imidazoles. The adducted imidazole acts as a catalyst, moving from one epoxy group to another as it facilitates epoxy ring opening and cure reactions. Imidazoles, in themselves, tend to be insoluble in epoxy resins. Thus, the purpose for adducting them to an epoxy resin is to make them compatible with the epoxy system. As a catalyst, the imidazole adduct is used at a level of from about 0.1 to about 8 parts per hundred parts of the extruded resin. For enhanced color stability, the 2-phenyl imidazole may be used as the catalyst for curing the epoxy resin with or without the low temperature curing agent. The 2-pheyl imidazole, which is available from the SW K Chemical Co., may be used as such at accordingly lower levels.

Imidazoles, as adducts or non-adducts, may also be used at higher levels as a separately added curing agent to the extruded mixture of the resin and catalyst. When this is done, the amount of imidazole adduct is controlled so that the total amount is no more than about 12 phr.

Otherwise, the low temperature curing agent may be selected from among the many that are commercially available but an epoxy adduct of an aliphatic polyamine having a primary amino group is preferable. A suitable curing agent of that type is available from Ciba-Geigy as its HT 835 hardener. A similar product is sold under the trademark ANCAMINE 2337 XS by Air Products & Chemicals. An epoxy adduct of an aliphatic polyamine having a secondary amino group available under the trademark ANCAMINE 2014 AS is preferred for white and light colored coatings. The amount of low temperature curing agent that may be added separately as component (B) to the pulverized extrudate of resin and catalyst is from about 2 to about 40 phr and the preferred amount is from about 30 to about 35 phr. The ratio of the low temperature curing agent to the catalyst in the extrudate is from about 1:3 to about 400:1 but preferably from about 2:1 to about 15:1.

The epoxy resin system shown in U.S. Pat. No. 5,721,052 constitutes another example of a system that can typically be used in this invention. Such epoxy resins are solid resins or blends of solid and small amounts of liquid resins up to about 10 wt. % which resins are the reaction products of a diol and a halohydrin. Suitable epoxy resins are exemplified by, but not limited to, the reaction products of bisphenol A and epichlorohydrin. Generally, the bisphenol A type epoxies used herein are of the type 1 to type 9 form, with the low viscosity type 3 or less epoxy resins being most preferred. The useful bisphenol A type epoxy resins have an epoxy equivalent weight ranging between about 400 and 2.250, preferably an epoxy equivalent weight of between about 550 and 1.100, with an epoxy equivalent weight of between about 600 and 750 being most preferred. Preferred epoxy resins include those sol under the tradename Araldite GT 7013 (type 3) and Araldite GT 7072 (type 2) by Ciba-Geigy corporation, which are both 4,4'-isopropylidene-diphenol-epichlorohydrin type epoxy resins.

The thermosetting powder coating compositions described above for both epoxy systems contain as another component, a catalytic curing agent. Such catalytic curing agent serves the dual function of curing agent and cure accelerator. No other curing agents need to be present in the powder coating compositions of the present invention. The advantage of this catalytic curing agent component is that it alone allows the coating powders to cure at lower cure temperatures or at ultra rapid cure rates, thereby permitting such compositions to be coated on heat sensitive materials, especially wood and plastic substrates, without deteriorating the physical and/or chemical properties of the substrate.

An imidazole and epoxy resin adduct, sold under the tradename Epon Curing Agent P-101 by Shell Chemical Company, can be used in the present invention. Another preferred imidazole adduct of a bisphenol A type epoxy resin is sold under the tradename HT 3261 by Ciba-Geigy Corporation. The imidazole or substituted imidazole residue, e.g., a 2-methylimidazole residue, typically comprises between about 5 and 50 wt. % of the imidazole/epoxy resin adduct composition.

It is believed that the epoxy component of the imidazole adduct readily promotes incorporation of the otherwise insoluble imidazoles in the epoxy resin component system. It is also believed that the formation of the adduct reduces the melting point of the imidazole, thereby lowering the cure reaction temperature between the epoxy groups and the adduct. It is further believed that the adduct when used alone without other curing agents allows the curing of the epoxy resin component to occur at significantly lower temperatures or at significantly higher rates. This permits the coating powders to be used on heat sensitive substrates, such as wood, without exposure of the substrate to excessive heat that tends to deteriorate the integrity of the substrate.

The catalytic cure agent is used at between about 1 and 8 parts per hundred resin (phr), most preferably between about 1 and 4 phr.

Another curing agent that can be used in combination with the low temperature curing agent to enhance the curing properties is dicyandiamide. A suitable dicyandiamide curing agent is sold under the tradename Dyhard 100S by SKW Chemicals. Such dicyandiamide curing agent may be used in the coating powder composition in an amount ranging up to about 8 phr, preferably between about 2 and 8 phr. And, more preferably between about 4 and 6 phr. Due to reactivity during curing, dicyandiamide is thus not available to function as an electrostatic charge enhancement agent when contained in epoxy resins having another curing agent that catalyzes the curing reaction between the epoxy resin and dicyandiamide. Thus, dicyandiamide, to function as an electrostatic charge enhancement agent, can only be used in epoxy systems not containing such other curing agent. Examples of curing agents that do not permit dicyandiamide to react include phenolics and acid functional polyesters.

If present, the dicyandiamide curing agent is used in the coating powder compositions in an amount ranging up to about 8 phr, preferably between about 2 and 8 phr. And, more preferably between about 4 and 6 phr.

If polyester resins are used, one method of achieving low temperature cure is using acid functional polyester and GMA containing crosslinking agents. A typical formulation is provided in the technical bulletin for GMA 300 from Estron Chemical Corporation. U.S. Pat. No. 5,436,311 describes matte powder coatings made from acid functional polyesters and glycidyl methacrylate containing resins. According to U.S. Pat. No. 5,436,311, the polyester used should be a linear polyester having an acid number of 20 to 50 mg KOH/g; its functionality, thus will be equal to 2. The functionality represents the average number of carboxyl groups per unit of molecular weight. Preferably, the polyester's number-average molecular weight is between 2,200 and 6,000. It is important to respect the values of these parameters to obtain matte coatings having good mechanical and chemical properties and good weathering resistance. In fact, if the polyester is a branched polyester (functionality greater than 2) or if the acid number of the polyester is 70 mg KOH/g, the coating obtained is not matte but glossy. The glass transition temperature (Tg) of the polyester is preferably between 50.degree. and 80.degree. C., so that the polyester remains solid at a normal storage temperature (20.degree. to 50.degree. C.), thereby preventing reagglomeration of the powdered thermosetting compositions during handling, transport and storage. The acid constituent of the linear carboxyl group-containing polyester is an organic dicarboxylic acid, which can be an aromatic dicarboxylic acid, such as terephthalic acid, isophthalic acid, phthalic acid, and the like, or an aliphatic or cycloaliphatic dicarboxylic acid, such as adipic acid, succinic acid, 1,4-cyclohexanedicarboxylic acid, and the like, alone or in admixture. These acids can be used in the form of the free acid, the anhydride, or an ester with a lower aliphatic alcohol.

The alcoholic constituent of the linear carboxyl group-containing polyester is an organic dihydroxy compound, which is preferably selected from aliphatic diols, such as neopentyl glycol, ethylene glycol, diethylene glycol, 1,4-butanediol, 1,6-hexanediol, neopentyl glycol hydroxypivalate, 1,4-cyclohexanedimethanol, 2,2-bis(4-hydroxycyclohexyl)propane and the like, alone or in admixture. Polyesters consisting mainly of terephthalic acid, isophthalic acid and neopentyl glycol are preferably used, but polyesters in which all the constituents are aliphatic compounds can also be used.

The carboxyl group-containing polyester is prepared by conventional methods for synthesizing polyesters by direct esterification or by transesterification, in one or more steps. In the latter case, a hydroxyl group-containing polyester is first prepared from one or more organic dicarboxylic acids (or their functional derivatives) and an excess of an organic dihydroxy compound, and the hydroxyl group-containing polyester thus obtained is then esterified with an organic dicarboxylic acid to produce a linear carboxyl group-containing polyester.

The polyester synthesis is generally carried out in a reactor equipped with a stirrer, an inert gas (nitrogen, for example) inlet and outlet, a thermocouple, an adiabatic column, a condenser, a water separator and a vacuum connection tube. The esterification conditions are the classical conditions, that is to say a conventional esterification catalyst, such as dibutyltin oxide or n-butyltin trioctanoate, can be used in an amount of 0.01 to 0.5% by weight of the reagents, and optionally an antioxidant, for example tributyl phosphite, can be added in an amount of 0.01 to 0.5% by weight of the reagents.

Polyesterification is generally carried out at a temperature which is gradually increased from 130° C. to about 200° C. to 240° C., first under normal pressure and then under reduced pressure, such temperature being maintained until a polyester which has the desired hydroxyl and/or acid number is obtained. In a two-step process, the reaction mixture containing the hydroxyl group-containing polyester obtained in the first step is allowed to cool to 200° C., the desired amount of dicarboxylic acid is added, the temperature is brought to 225° C. and such temperature is maintained, first under normal pressure and then under reduced pressure until a carboxyl group-containing polyester having the desired acid number is obtained, which can vary between 20 and 50 mg KOH/g polyester. The degree of esterification is monitored by determining the amount of water formed in the course of the reaction and the properties of the polyester obtained, for example the acid number, the molecular weight or the viscosity. At the end of the synthesis, the polyester is cast into a thick layer, allowed to cool, and then ground into particles having an average size of from a fraction of a mm to a few mm.

The glycidyl group-containing acrylic copolymers suitable for use in the powdered thermosetting compositions of the present invention are obtained from 5 to 30% by weight of glycidyl acrylate or glycidyl methacrylate and 70 to 95% by weight of methyl methacrylate. Optionally, up to 25% by weight of the methyl methacrylate can be replaced by another vinyl monomer.

According to U.S. Pat. No. 5,436,311, the glycidyl group-containing acrylic copolymer should have a number-average molecular weight (Mn) of between about 4,000 and about 10,000, and preferably a number-average molecular weight within the range of from more than 5,000 to 9,000. For better control of this molecular weight and its distribution, the monomers are polymerized in the presence of a free radical polymerization initiator and a chain transfer agent. The polydispersity of these copolymers Mw/Mn is preferably between 1.5 and 2.5 (Mn being the number-average molecular weight and Mw being the weight-average molecular weight).

It is essential that an acrylic copolymer containing glycidyl groups is used in the composition according to U.S. Pat. No. 5,436,311. In fact, it has been discovered, that this copolymer plays an essential role in obtaining matte coatings having good properties of appearance, adhesion to metal substrates and weathering resistance. It has been found, in fact, that only compositions containing acrylic copolymers of which the number-average molecular weight Mn is within the range from 4,000 to 10,000 give coatings having both a matte and regular appearance and good adhesion to a metal substrate. If the molecular weight of the acrylic copolymer is less than 4,000 the coating obtained is not matte but glossy. If the molecular weight of the acrylic copolymer is greater than 10,000 the coating obtained is matte but does not adhere sufficiently to a metal substrate and has defects on its surface.

The monomer composition of the acrylic copolymer is also very critical for obtaining matte coatings. If its content of glycidyl acrylate or glycidyl methacrylate exceeds 30% by weight, the coating obtained is not matte but glossy. On the other hand, it is absolutely necessary for the acrylic polymer to contain a preponderant amount of methyl methacrylate besides the glycidyl acrylate or methacrylate. In fact, if more than 25% by weight of the methyl methacrylate is replaced by (an)other vinyl monomer(s), a coating which is clearly more glossy is obtained. Examples of the vinyl monomer which can be used as a comonomer to replace the methyl methacrylate in the acrylic copolymer include alkyl acrylates and methacrylates, such as methyl acrylate, ethyl acrylate, butyl acrylate, 2-ethylhexyl acrylate, ethyl methacrylate, butyl methacrylate, styrene, and the like, alone or in admixture.

The acrylic copolymer containing glycidyl groups has a functionality of preferably between 2 and 12 (the functionality represents the average number of epoxy groups per unit of molecular weight). The content of epoxy groups in the acrylic polymer is preferably between 0.3 and 2.2 milliequivalents of epoxy/g polymer. The glass transition temperature (Tg) of the acrylic copolymer is preferably between 40.degree. and 70.degree. C., and its viscosity determined by the ICI method at 200.degree. C. (see examples) is between 8,000 and 40,000 mPa.s.

The glycidyl group-containing acrylic copolymer is prepared by conventional polymerization techniques, either in mass, in emulsion, or in solution in an organic solvent. The nature of the solvent is very little of importance, provided that it is inert and that it readily dissolves the monomers and the synthesized copolymer. Suitable solvents include toluene, ethyl acetate, xylene etc. The monomers are copolymerized in the presence of a free radical polymerization initiator (benzoyl peroxide, dibutyl peroxide, azo-bis-isobutyronitrile, and the like) in an amount representing 0.1 to 1% by weight of the monomers.

To achieve good control of the molecular weight and its distribution, a chain transfer agent, preferably of the mercaptan type, such as n-dodecylmercaptan, t-dodecanethiol, isooctylmercaptan, or of the carbon halide type, such as carbon tetrabromide, bromotrichloromethane etc., is also added in the course of the reaction. The chain transfer agent is used in an amount of from 1.5 to 4%, preferably between 2 and 3.5% by weight of the monomers used in the copolymerization.

A cylindrical, double-walled reactor equipped with a stirrer, a condenser, an inert gas (nitrogen, for example) inlet and outlet and a metering pump feed system is generally used to prepare the glycidyl group-containing acrylic copolymer. Polymerization is carried out under conventional conditions. Thus, when polymerization is carried out in solution, for example, an organic solvent is introduced into the reactor and heated to reflux temperature under an inert gas atmosphere (nitrogen, carbon dioxide, and the like), and a homogeneous mixture of the required monomers, free radical polymerization initiator and chain transfer agent is then added to the solvent gradually over several hours. The reaction mixture is then maintained at reflux temperature for some hours, while stirring, and the major portion of the solvent is then distilled off. The copolymer obtained is subsequently freed from the remainder of the solvent in vacuo. The acrylic copolymer obtained is in the form of a solid product, which is easily ground to give a whitish powder.

The linear carboxyl group-containing polyester and the glycidyl group-containing acrylic copolymer described above together constitute the basic binder for the powdered thermosetting compositions according to the present invention. The results show that the acrylic copolymer must contain a certain amount of glycidyl methacrylate to allow cross-linking of the coating. An example which includes the acrylic polymer containing no glycidyl methacrylate (0%), gives a coating having properties which are clearly less good (poor adhesion) and an irregular appearance. In addition, it can be seen that when the amount of glycidyl methacrylate in the acrylic copolymer is too high, it is no longer possible to obtain matte coatings. Thus, for example, a composition including copolymer which contains 40% by weight of glycidyl methacrylate, provides a glossy coating (gloss of 41) and a composition containing copolymer of the same composition, but with a lower molecular weight, also provides a glossy coating. This demonstrates that, in order to obtain a matte coating the use of an acrylic copolymer containing more than 30% by weight of glycidyl methacrylate, with respect to the total weight of monomers, is not advisable.

U.S. Pat. No. 5,436,311 also relates to the use of the powdered thermosetting compositions according to the invention for the preparation of powdered varnishes and paints which produce matte coatings, as well as to powdered varnishes and paints obtained by means of these compositions. The ratio of the amount of linear carboxyl group-containing polyester to the amount of glycidyl group-containing acrylic copolymer in the powdered thermosetting compositions of the present invention is such that there are 0.5 to 1.5, and preferably 0.8 to 1.2 equivalents of carboxyl groups per equivalent of epoxy groups in the acrylic copolymer.

In the above mentioned patent, the formulations that led to higher gloss contained GMA resins with epoxy equivalent weights of less than 300 (with 40% by weight of GMA content in the copolymer). With constant molecular weight if the epoxy equivalent weight is reduced, the functionality increases and hence the reactivity. So these formulations that contained acid functional polyesters with acid numbers in the range of 20–50 and GMA crosslinkers with epoxy equivalent weight of approximately 300 are typical formulations our present invention uses for low temperature cure.

U.S. Pat. No. 5,270,416 also discloses glycidyl methacrylate containing resins crosslinked with carboxylic acid functional crosslinkers and polyesters. If acrylic resins are used, GMA resins such as PD 7690 from Anderson Development Company can be used with DDA as curing agent in presence of catalysts that promote this reaction. Preferred crosslinkers comprise a dicarboxylic acid component such as aliphatic dicarboxylic acids having between 9 and 20 carbon atoms. Suitable aliphatic dicarboxylic acids include for instance dodecane dioic acid (dodecyl dicarboxylic acid) and sebacic acid. The preferred dicarboxylic acid is dodecane dioic acid and the preferred level of dicarboxylic acid crosslinker is between 9% and 25%. Suitable crosslinkers further include low molecular weight carboxylic acid functional polyesters which can be utilized at levels between about 10% and 30%. Useful polyesters comprise a low molecular weight linear polyester polymer having a number average molecular weight between about 250 and 1000 preferably between 250 and 500, while the Acid No. should be above about 150 and preferable between 250 and 400. Suitable low molecular weight polyesters comprise the esterification product of a glycol with dicarboxylic acid, where linear aliphatic glycols esterified with lesser equivalents of a linear saturated dicarboxylic acid having between 2 and 12 linear carbon atoms such as adipic, azelaic, succinic, glutaric, pimelic, suberic or sebacic acid. Preferred and commercially available linear saturated dicarboxylic acids are adipic or azelaic acid. Minor amounts of aromatic dicarboxylic acids (anhydrides) such as phthalic, isophthalic, terephthalic, and tetrahydrophthalic can be included, if desired, within molecular weight range. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols or ether glycols such as diethylene glycol and dipropylene glycol and bisphenol ethers. The preferred glycol is ethylene glycol. World patent publication WO 99/16838 discloses achieving low gloss in these compositions using styrene maleic anhydride copolymers as a gloss reducing agent.

U.S. Pat. Nos. 4,147,737 and 5,168,110 disclose other glycidyl functional crosslinkers that can be used with acid functional polyesters as thermosetting powder coating compositions. Epoxy resins such as that are based on bisphenol A can also be used as crosslinkers to form hybrid powder coatings. Such epoxy resins are discussed above and disclosed in U.S. Pat. No. 5,721,052.

European Patent Application 0 214 448 (A2) discloses compositions containing acid group containing acrylic polymer and epoxy resins.

The acid group-containing acrylic polymer is preferably a carboxylic acid group-containing acrylic polymer and can be formed by reacting apolymerizable alpha, beta-ethylenically unsaturated carboxylic acid with one or more other polymerizable alpha, beta-ethylenically unsaturated monomers, particularly vinyl aromatic monomers and estera of alpha, beta-ethylenically unsaturated carboxylic acids.

Examples of the carboxylic acid group-containing monomers which can be used are acrylic acid and methacrylic acid, which are preferred, as well as crotonic acid, itaconic acid, fumaric acid, maleic acid, citraconic acid, and the like, as well as monoalkyl esters of unsaturated dicarboxylic acids such as itaconic acid, fumaric acid, maleic acid, citraconic acid, and the like. The acid group-containing monomer is preferably present in the polymer in amounts of about 3 to 25 percent, more preferably from about 5 to 20 percent by weight based on total weight of the monomers. Amounts less than 3 percent result in poorer solvent resistance and poorer mechanical strength of the coating.

Examples of vinyl aromatic compounds are monofunctional vinyl aromatic compounds such as styrene which is preferred, toluene and alkyl-substituted styrenes such as toluene and chloro-substituted styrene such as chlorostyrene. The vinyl aromatic monomer is preferably present in the composition in amounts of about 25 to 75, more preferably from about 40 to 75 by weight based on total weight of the monomers. Amounts less than 25 percent result in poor detergent resistance, whereas amounts greater than 75 percent result in poor flexibility.

Examples of the esters of the alpha, beta-ethylenically unsaturated acids are esters of acrylic and methacrylic acid and include methyl methacrylate, ethyl acrylate, butyl acrylate, 2-theylhexyl acrylate, dodecenyl acrylate, methyl methacrylate, ethyl methacrylate, N-butyl methacrylate, and 2-ethylhexyl methacrylate. Preferably, these esters are present in amounts of about 5 to 70, more preferably from about 10 to 50 percent by weight, based on total weight of the monomers. Amounts less than 5 percent result in brittle coatings, whereas amounts greater than 70 percent result in poor detergent resistance.

In addition to the vinyl aromatic compounds and the esters of acrylic an methacrylic acid, other ethylenically unsaturated copolymerizable monomers may be used. Examples include nitriles such as acrylonitrile, vinyl and vinylidene halides such as vinyl chloride and vinylidene fluoride and vinyl esters such as vinyl acetate. These additional monomers are present in amounts of about 0 to 40, preferably from 0 to 30 percent by weight based on total weight of monomers.

In preparing the acid group-containing acrylic polymer, the various monomers are mixed together and are reacted by conventional free radical initiated polymerization processes. Among the free radical initiators which may be used are benzoyl peroxide, tertiarybutyl hydroperoxide, ditertiarybutyl peroxide, azobis (2-methylpropionitirle), and so forth. The polymerization is preferably carried out in solution using a solvent in which the monomers are soluble such as toluene or xylene. At the completion of the polymerization, the reaction mixture can be devolatilized such as by placing under vacuum to remove the organic solvent and recovering the polymer as a sold material. Alternately, the polymer can be precipitated and subsequently dried. Usually, the devolatilized polymer will contain less than 1 percent by weight of materials that volatilize at the temperatures used for curing the coatings.

The acid group-containing acrylic polymer can also be prepared by emulsion polymerization, suspension polymerization, bulk polymerization or suitable combinations thereof. These techniques are well known in the art.

The acid group-containing acrylic polymer is preferably used in amounts of about 40 to 80, more preferably 50 to 70 percent by weight based on weight of resin solids. Amounts less than 40 percent by weight are not preferred because of poor heat and color stability, whereas amounts greater than 80 percent by weight result in poor flexibility and corrosion resistance.

Besides the carboxylic acid group-containing copolymer, the thermosetting powder coating composition of the invention preferably contains another acid group-containing material which is either a dibasic acid derived from a $C_4$ to $C_{20}$ aliphatic dicarboxylic acid or a carboxylic acid group-terminated polyester. These particular materials are desirable because they provide flexibility and impact resistance in the resultant coating. Among the aliphatic dicarboxylic acids which may be used include adipic acid, subaric acid, azelaic acid, sebacic acid, and dodecanedioic acid. Preferably, the aliphatic dicarboxylic acid is a solid at room temperature.

Acrylic resins for hybrid coating powders are available from SC Johnson. Product designations include SCX820, 831, and 848.

In all of the above compositions, suitable catalysts can be used to enhance low temperature cure characteristics. For all of the thermosetting compositions involving acid functional and glycidyl functional materials suitable catalysts can be chosen from amines (such as DBU), ammonium salts (such as tetra butyl ammonium bromide, benzyl trimethyl ammonium chloride), phosphine (such as triphenyl phosphine), phosphonium salts (such as ethyl triphenyl phosphonium bromide), imidazole (such as 2-methyl imidazole, 2-phenyl imidazole), imidazole adducts (such as P101 from shell, HT 3261 from Ciba Geigy) can be used. U.S. Pat. Nos. 5,169,473 and 4,868,059 disclose catalysts useful for crosslinking glycidyl containing resins. Examples of catalyst that are discussed in these patents are compounds containing amine, phosphine, heterocyclic nitrogen, ammonium, phosphonium, arsonium or sulfonium moieties. Especially preferred are the alkyl-substituted imidazoles; 2,5-chloro-4-ethyl imidazole; and phenyl substituted imidazoles, and mixtures thereof. Even more preferred are 2-methyl imidazole; 2-ethyl, 4-methyl imidazole; 1,2-dimethylimidazole; and 2-phenyl imidazole. Especially preferred is 2-methyl imidazole. Particularly suitable catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate acetic acid complex), ethyltriphenylphosphonium tetrahaloborate, tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate acetic acid complex), tetrabutylphosphonium tetrahaloborate, butyltriphenylphosphonium tetrabromobisphenate, butyltriphenylphosphonium bisphenate, butyltriphenylphosphonium bicarbonate, benzyltrimethylammonium chloride, benzyltrimethylammonium hydroxide, benzyltrimethylammonium tetrahaloborate, tetramethylammonium hydroxide, tetrabutylammonium hydroxide, tetrabutylammonium tetrahaloborate, and mixtures thereof and the like.

Other suitable catalysts include tertiary amines such as, for example, triethylamine, tripropylamine, tributylamine, benzyldimethylamine, imidazoles such as 2-methylimidazole mixtures thereof and the like.

Other suitable catalysts include ammonium compounds such as, for example, triethylamine.HCl complex, triethylamine.HBr complex, triethylamine.HI complex, triethylamine.tetrahaloboric acid complex, tributylamine.HCl complex, tributylamine.HBr complex, tributylamine.HI complex, tributylamine.tetrahaloboric acid complex, N,N'-dimethyl-1,2-diaminoethane.tetrahaloboric acid complex, and mixtures thereof and the like.

Other suitable catalysts include quaternary and tertiary ammonium, phosphonium, and arsonium adducts or complexes with suitable non-nucleophilic acids such as, for example, fluoboric, fluoarsenic, fluoantimonic, fluophosphoric, perchloric, perbromic, periodic, mixtures thereof and the like. U.S. Pat. No. 5,169,473 discloses latent catalysts that are useful for the present invention.

U.S. Pat. Nos. 5,304,332 and 5,480,726 disclose a process where the hardness and appearance of in-mold coatings are improved by the addition of melamine or benzoguanamine to an unsaturated polyester coating powder. Such coating powder is applied to a metal mold. In contrast, the present invention relates to coating powder compositions containing inert nitrogen-containing compounds with enhanced charging characteristics when applied to non-conductive substrates.

When unsaturated polyester thermosetting resins, such as described in U.S. Pat. No. 5,480,726 are used in the present invention, a surface curing initiator must be included in such unsaturated polyester composition. Suitable initiators include a cobalt redox catalyst and thermal initiator, and peroxide to obtain surface curing of the coating powder resin. U.S. Pat. No. 6,048,949 and European published Patent Application No. 0148637 A2 disclose metal containing organic compounds that provide the necessary surface cure for the present invention. The in-mold coating described in U.S. Pat. No. 5,480,726 will not cure at the surface because air prevents surface curing of such formulations. During the curing step described in U.S. Pat. No. 5,480,726, curing is performed in a closed area having air inhibition to obtain a surface cure. Should radiation curing such as by UV radiation be used, a UV initiator must be added to the composition.

It should be understood that the term in the claims "consisting essentially of" includes as optional components of the coating powder composition at least the ingredients shown below.

In addition to the above-described thermosetting resin polymer, the coating powder composition may optionally include as another component, a texturing agent for achieving the desired grainy textured effect of the finish. The texturing agents which may be employed in the thermosetting powder coating compositions of the present invention are exemplified by, without limitation, organophilic clays, such as an organophilic clay sold under the tradename Bentone 27 and Bentone 38 by NL Chemicals, which are trialkylarylammoniumhectorite and tetraalkylammoniumsmectite, respectively, rubber particles, such as acrylonitrile butadiene copolymers, including those sold under the tradename Nipol 1422 and 1411 by Zeon Chemicals, and thermoplastic polymers, such as polypropylene. The amount of texturing agent used determines the coarseness or fineness of the texture. The texturing agent is used in a range up to about 30 phr, preferably between about 1 and 20 phr, and, most preferably between about 2 and 10 phr. If rubber particles are used as the texturing agent, it is generally preferred to incorporate them in the powder coating composition in an amount ranging between about 5 and 30 phr. And more preferably between about 10 and 20 phr. It is believed that the texturing agent contributes to the high viscosity and low melt flow of the powder coating composition leading to the textured finish and, thus, provides for better edge coverage and hiding of surface imperfections of wood substrates.

The thermosetting powder coatings of the present invention may also desirably include as another component, a flow control agent. The flow control agents which may be employed in the thermosetting powder coating compositions are exemplified by, without limitation, acrylic resins. These acrylic resins are generally liquids which have been converted to powder form by absorption onto silica-type materials. A preferred flow control agent is sold under the tradename Resiflow P-67 acrylic resin by Estron Chemical, Inc., which is a 2-propenoic acid, ethyl ester polymer. Another preferred flow control agent is sold under the tradename Benzoin by DSM, Inc., which is a 2-hydroxy-1.2-diphenylethanone crystalline sold that is believed to keep the molten coating open for a suitable time to allow outgassing to occur prior to the formation of the hard set film. The flow control agent is used in a range between about 1 and 5 phr, preferably between about 1.5 and 2.5 phr.

Fumed silica and aluminum oxide may also be included as a powder dry flow additive. An example of fumed silica is sold under the tradename Cab-O-Sil by Cabot Corporation. An example of aluminum oxide is sold under the tradename Aluminum Oxide C by Degussa Corporation.

In addition, the thermosetting powder coating compositions may contain pigments as another component. Any of the usual pigments may be employed in the thermosetting powder coating of the invention to obtain the desired color and opacity. Examples of useful pigments for the black textured powder coatings include, without limitation, carbon black and black iron oxide. A preferred carbon black pigment is sold under the tradename Raven 22 and Raven 1255 by Columbian Chemical Company. An example of a useful pigment for white textured powder coatings include, without limitation, titanium dioxide. The pigment is used in a range up to about 100 phr, more preferably between about 1 and 4 phr for a black textured finish and between about 15 and 80 phr for a white textured finish.

The thermosetting powder coating compositions of this invention may contain extenders or fillers as another component. If a textured finish is desired, the extender loading can be rather high to lower the melt flow of the powder coating and allow the molten coating to cure while retaining some of the finish of the powder particles as applied. The level of extenders can also be used to control the coarseness or fineness of the finish. The extenders which may be employed in the thermosetting powder coating compositions of the present invention are exemplified by, without limitation, calcium carbonate, barium sulfate, wollastonite, and mica. The extender is used in a range up to 120 phr, more preferably between about 10 and 80 phr.

In addition to the above components, the thermosetting powder coating compositions of this invention may also contain the usual additives common to powder coatings. These additives include, without limitation, gloss control waxes, such as polyethylene, slip additives, such as Teflon and siloxanes, and the like.

When metallic substrates are coated with electrostatically charged coating powder particles, such particles are attracted to the grounded metal part and thereby significant the coating thicknesses, on the order of up to 20 mils can be obtained. However, electrically non-conductive parts cannot dissipate charge and thereby cannot obtain substantial build-up of the powder on the surface of the part. This invention solves such problem through the addition of an electrostatic charge enhancement agent into the above discussed thermosetting resinous polymer composition. It is believed further that the charge enhancing agents of the invention dissipate the charge after the coating is deposited onto the non-conductive substrate and thus facilitate the deposition of more powder.

Nitrogen-containing inert materials such as melamine, urea, dicyandramide, and benzoguanamine are preferred electrostatic charge enhancement agents due to availability considerations but it is to be understood that derivatives of melamine and urea, such as ammelaine, melamammelide, ammelide, melem, melam, ureidomelamine, polyurea, oligomeric melamine, ortho toyl biguanide (OTB) and others can be used in the invention.

The electrostatic charge enhancement compounds of the invention may be incorporated into the coating powders of the present invention in an effective amount to enhance the electrostatic chargeability of the coating powder. Typically, at about at least 1 part of the compound per 100 parts of resin (1 ppr) are incorporated. Such compounds may be incorporated in amounts of about 1 to about 30 parts, based upon 100 parts of resin. The lower limit is selected because at least about 1 part is needed to enhance charge for commercial coating activity. The upper limit of 30 parts constitutes an amount where appreciably more enhancement is not required. Preferably about 1 part to 20 parts by weight may be employed because the incremental increase is not very high after 20 part, and chargeability is extremely good at 20 parts. Most preferably, a range of from about 5 to 20 parts may be used.

Examples of suitable electrically non-conductive, heat sensitive heat sensitive substrates useful in the present invention include wood, such as hardwood, hard board, laminated bamboo, wood composites, such as particle board, electrically conductive particle board, fiber board, medium density fiber board, masonite board, laminated bamboo, and other substrates that contain a significant amount of wood. Wood substrates are typically used in kitchen cabinetry, shelving and storage units, home and business furniture, computer furniture, etc.

Other non-conductive, heat sensitive substrates are plastics, such as ABS, PPO, SMC, polyolefins, acrylics, nylons and other copolymers which usually will warp or outgas when coated and heated with traditional heat curable powders. The plastics are typically used in automotive parts. Still other heat sensitive substrates include paper, cardboard, and composites and components with a heat sensitive aspect, and the like.

In addition to coating non-conductive substrates, it is also contemplated that the coating powders of the invention can advantageously be used to coat conductive substrates such as thin metal substrates where it is desired to cure the coating at temperatures below about 300° F. to prevent damage, such as warpage, to the thin substrate. Other conductive substrates such as those having complex shapes, can beneficially use the coating powders of the invention due to enhanced chargeability. The coating powders of the present invention also can advantageously be used to coat substrates having comers and other difficult-to-coat portions. Curing temperatures less than or greater than 300° F. can be used.

Non-conductive, heat resistant substrates include glass, ceramics, ceramic tiles, carbon, and graphite.

The coating powders of this invention are applied in dry, free flowing, solid powder form over the substrate to be coated. Preferably, the powders are sprayed onto the substrate by well known electrostatic powder spray techniques, such as corona discharge or triboelectric electrostatic spray techniques.

Next, the powders are exposed to sufficient heat to melt, level and flow out the powders into a continuous molten film having the desired smoothness, and activate the cure. Heating may take place in either infrared or convection ovens, or a combination of both. Sufficient outgassing of substrate volatiles simultaneously occurs during the flow out step to eliminate surface defects, such as blisters and pin holes.

In addition, certain powders of the invention may be cured by radiation such as ultraviolet or electron beam or a combination of thermal and radiation curing such as taught in U.S. Pat. No. 5,923,473.

The invention will be further clarified by a consideration of the following specific examples which are intended to be purely exemplary of the invention.

To evaluate the charging characteristics of the various coating powders, a simple test was developed. A known amount of material was manually sprayed by a corona discharge gun and applied while maintaining all spray parameters constant over same surface area. The coverage obtained on of the part on the edges and on the back provides a measure of the charging characteristics of the powder coating. Charging was rated 1 through 10, with 10 being the best charging characteristic.

TABLE 1

| Raw Material | 100-26-1 | 100-26-1 | 100-26-3 | 100-32-1 | 100-32-2 |
|---|---|---|---|---|---|
| Acid functional polyester (1) | 80 | 80 | 80 | 80 | 80 |
| Glycidyl methacrylate resin (2) | 20 | 20 | 20 | 20 | 20 |
| Irgafos 168 (3) | 0.8 | 0.8 | 0.8 | | |
| Irganox 1010 (3) | 0.8 | 0.8 | 0.8 | | |
| Powdertex 61 (4) | 0.2 | 0.2 | 0.2 | | |
| Bentone 38 (5) | 0.3 | 0.3 | 0.3 | 2 | 2 |
| HT 3261 (6) | 3 | 3 | 3 | 3 | 3 |
| Pigments | 0.5 | 0.5 | 0.5 | 2 | 2 |
| Calcium Carbonate (7) | | | | 60 | 60 |
| Melamine | 0 | 5 | 10 | 2 | 20 |

(1) Ruco 911 from Ruco Polymer
(2) GMA 300 from Estron Chemicals
(3) Heat Stabilizers from Ciba Geigy
(4) Texturing agent from Shamrock Technologies
(5) Texturing agent from Rheox Inc.
(6) Imidazole adduct of epoxy resin from Ciba Geigy
(7) Hubercarb G-8 from J. M. Huber Corporation
(8) Ground Melamine from Melamine Chemicals Inc.

Properties of the above compositions

| Property | 100-26-1 | 100-26-2 | 100-26-3 | 100-32-1 | 100-32-2 |
|---|---|---|---|---|---|
| Geltime (1) | 98 | 100 | 95 | 110 | 102 |
| Gloss (visual) | High | High | High | High | High |

-continued

| Property | 100-26-1 | 100-26-2 | 100-26-3 | 100-32-1 | 100-32-2 |
|---|---|---|---|---|---|
| Charge-ability rating (2) | 0 | 5 | 8 | 3 | 10 |
| Solvent Resistance | Slight rub off | Slight rub off | Slight rub off | Slight rub off | Slight rub off |

(1) Geltime in seconds at 300° F.
(2) Using the screening method given below

The formulations used are typical formulations set forth in U.S. Pat. No. 5,436,311. Suitable catalysts were incorporated to provide the necessary low temperature cure. The acid functional polyester may have an acid number between 20 and 50 with functionality of 2 and above. The GMA crosslinker may have equivalent weight between 250 and 600 with functionality of 4 and above. The stoichiometry may vary from 0.5 to 2.0 of the GMA crosslinker to the polyester resin. Thus the ratio of the polyester to GMA may vary between 90:10 to 70:30. This ratio will also vary based upon the equivalent weight of the GMA crosslinker used. The level of catalyst (HT 3261) may vary between 0.5 phr to 10 phr. In the examples given above the catalyst was used at 3 phr. The solvent resistance indicates that these formulations are capable of curing at low temperatures on heat sensitive substrates and provide good coating properties. These results also indicate that the addition of melamine to the powder coating compositions did not change the cure speed (geltime and solvent resistance) or the appearance (visual gloss) of the coating. The chargeability of the product was very substantially improved with the addition of melamine powder.

TABLE 2

| Raw Material | 100-27-1 | 100-27-4 | 100-25-3 | 100-25-5 |
|---|---|---|---|---|
| SCX 821 (1) | 35 | 35 | | |
| SCX 848 (1) | 15 | 15 | | |
| SCX 815 (1) | | | 92 | 92 |
| GT 7072 (2) | 50 | 50 | | |
| PT 810 (3) | 50 | 50 | 8 | 8 |
| Resiflow P 67 (4) | 1.4 | 1.4 | 1.0 | 1.0 |
| Benzoin (5) | 0.8 | 0.8 | 0.8 | 0.8 |
| Raven 1255 (6) | 2 | 2 | 2 | 2 |
| Calcium Carbonate | 45 | 45 | 45 | 45 |
| Powdertex 61 | 2 | 2 | 2 | 2 |
| 2 Phenyl imidazole | 2 | 2 | | |
| Actiron 43-65 (7) | | | 0.5 | 0.5 |
| Melamine | | 5 | | |
| Dicyandiamide | | | | 10 |

(1) Acid functional acrylic resin from SC Johnson Polymer
(2) Bis A epoxy resin from Ciba Geigy
(3) TGIC from Ciba Geigy
(4) Acrylic flow agent from Estron Chemical
(5) Outgassing agent from Estron Chemical
(6) Carbon black pigment from Columbian Chemicals
(7) Tetra butyl ammonium bromide from Synthron

| Properties | 100-27-1 | 100-27-4 | 100-25-3 | 100-25-5 |
|---|---|---|---|---|
| Geltime (sec) | 120 | 111 | 82 | 90 |
| 60° Gloss | 1.5 | 2.0 | 15 | 13 |
| Chargeability rating | 0 | 6 | 0 | 6 |
| Solvent Resistance | Slight rub off | Slight rub off | No rub off | No rub off |

Compositions 100-27-1 and 100-27-2 are acrylic epoxy hybrid, and compositions 100-25-3 and 100-25-5 are acrylic TGIC hybrid. The acid functional acrylic resin may be selected from a whole range of products with acid number ranging between 40 (SCX 815) and 220 (SCX 848). The epoxy functional resin may be chosen from bis A type epoxies, epoxy phenol novolac, epoxy cresol novolac and TGIC. The stoichiometry of acid groups to epoxy groups can be adjusted to be between 0.5 and 2.0. Suitable catalysts such as 2-phenyl imidazole for acrylic epoxy hybrid and tetrabutyl ammonium bromide for the acrylic TGIC hybrid are used to achieve low temperature cure suitable for our application. The above results also illustrate that the addition of melamine and dicyandiamide does not alter cure speed and appearance but functions to significantly improve the electrostatic chargeability of the coating powder.

I claim:

1. A coating powder consisting essentially of an inert nitrogen-containing compound which is a member selected from the group consisting of melamine, urea, benzoguanamine, ammelaine, melamammelide, ammelide, melem, melam, ureidomelamine, polyurea, oligomeric melamine, and ortho toyl biguanide, said compound being present in an effective amount to enhance the electrostatic chargeability of said coating powder, balance essentially a thermosetting resin polymer which is a member selected from the group consisting of epoxies, saturated polyesters, polyester-epoxy hybrids, acrylics, epoxy functional acrylics, and admixtures thereof.

2. The coating powder of claim 1, wherein said thermosetting resin polymer is capable of curing at a temperature below about 300° F.

3. The coating powder of claim 1, wherein said inert nitrogen-containing compound is present in an amount of at least 1 part by weight per 100 parts by weight of resin.

4. The coating powder of claim 3, wherein said inert nitrogen-containing compound is present in an amount from about 1 to about 30 parts by weight per 100 parts by weight of resin.

5. The coating powder of claim 4, wherein said inert nitrogen-containing compound is present in an amount from about 1 to about 20 parts by weight per 100 parts by weight of resin.

6. The coating powder of claim 5, wherein said inert nitrogen-containing compound is present in an amount of from about 5 to about 20 parts by weight per 100 parts by weight of resin.

7. A coating powder consisting essentially of about 5 to about 20 parts by weight, based upon 100 parts by weight of thermosetting epoxy resin polymer of melamine, balance essentially a thermosetting epoxy resin capable of curing at a temperature below about 300° F.

8. A powder coated article comprising a non-conductive substrate coated with a cured coating powder consisting essentially of an inert nitrogen-containing compound which is a member selected from the group consisting of melamine, urea, benzoguanamine, ammelaine, melamammelide, ammelide, melem, melam, ureidomelamine, polyurea, oligomeric melamine, and ortho toyl biguanide, said compound being present in an effective amount to enhance the electrostatic chargeability of said coating powder, balance essentially a thermosetting resin polymer which is a member selected from the group consisting of epoxies, saturated polyesters, polyester-epoxy hybrids, acrylics, epoxy functional acrylics, and admixtures thereof.

9. The powder coated article of claim 8, wherein said thermosetting resin polymer is capable of curing at a temperature below about 300° F.

10. The powder coated article of claim 8, wherein said inert nitrogen-containing compound is present in an amount of at least about 1 part by weight per 100 parts by weight of resin.

11. The powder coated article of claim 10, wherein said inert nitrogen-containing compound is present in an amount of at least about 1 part by weight to about 30 parts by weight per 100 parts by weight of resin.

12. The powder coated article of claim 11, wherein said inert nitrogen-containing compound is present in an amount of at least about 1 part by weight to about 20 parts by weight per 100 parts by weight of resin.

13. The powder coated article of claim 12, wherein said inert nitrogen-containing compound is present in an amount of at least about 5 parts by weight to about 20 parts by weight per 100 parts by weight of resin.

14. The powder coated article of claim 8, wherein said non-conductive substrate is a member selected from the group consisting of glass, ceramics, ceramic tile, carbon, and graphite.

15. A powder coated article comprising a non-conductive substrate coated with a cured coating powder consisting essentially of about 1 to 30 parts by weight, based upon 100 parts by weight of thermosetting epoxy resin polymer, of melamine, balance essentially a thermosetting epoxy resin polymer capable of curing at a temperature below about 300° F.

16. A powder coated article comprising a conductive substrate coated with a cured coating powder consisting essentially of an inert nitrogen-containing compound which is a member selected from the group consisting of melamine, urea, benzoguanamine, ammelaine, melamammelide, ammelide, melem, melam, ureidomelamine, polyurea, oligomeric melamine, and ortho toyl biguanide, said compound being present in an effective amount to enhance the electrostatic chargeability of said coating powder, balance essentially a thermosetting resin polymer which is a member selected from the group consisting of epoxies, saturated polyesters, polyester-epoxy hybrids, acrylics, epoxy functional acrylics, and admixtures thereof.

* * * * *